July 27, 1954     P. R. SCHROEPPEL     2,684,564
MOWER

Original Filed July 14, 1945     6 Sheets-Sheet 1

INVENTOR
Paul R. Schroeppel
BY
Emerson B. Donnell

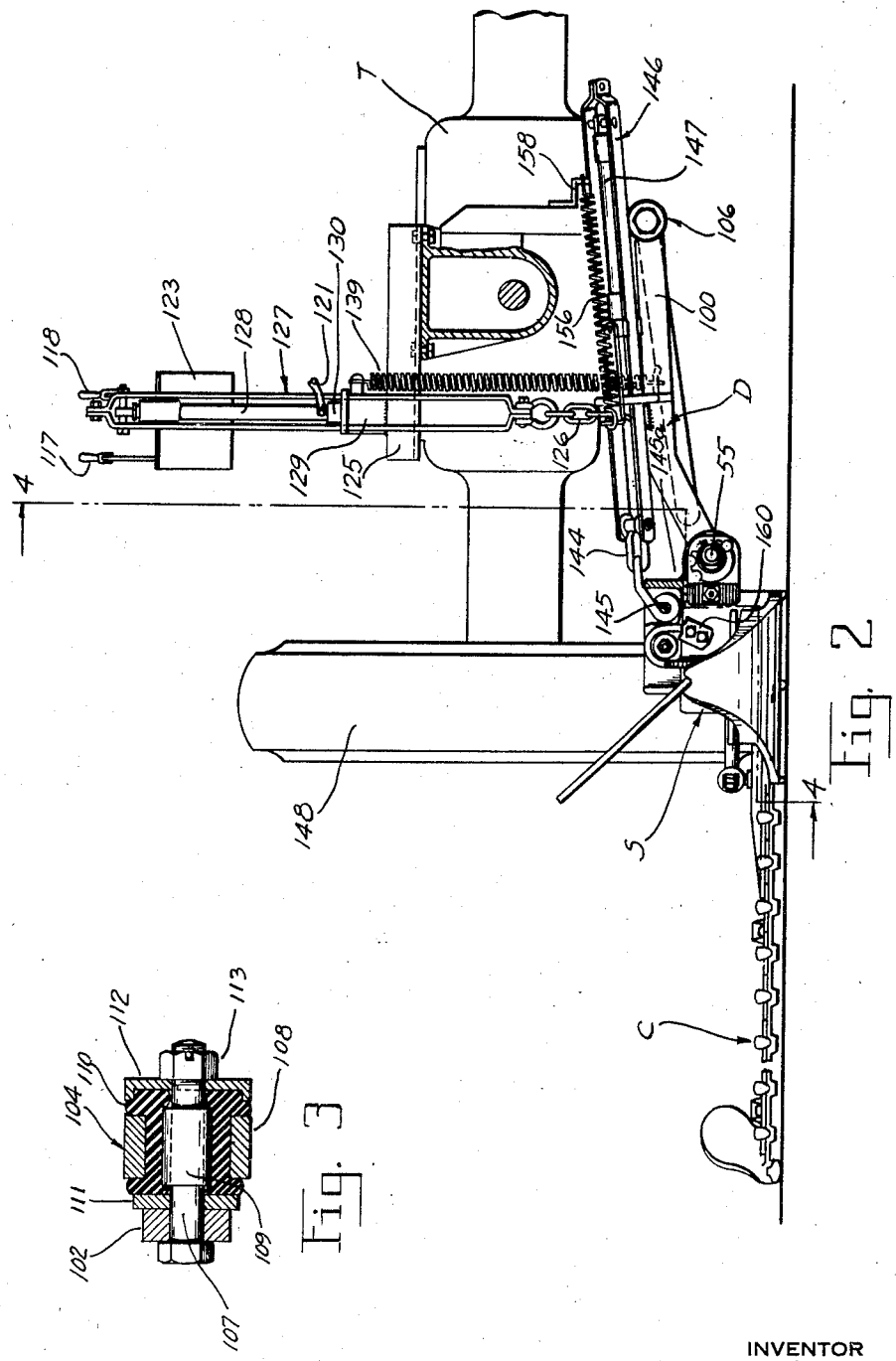

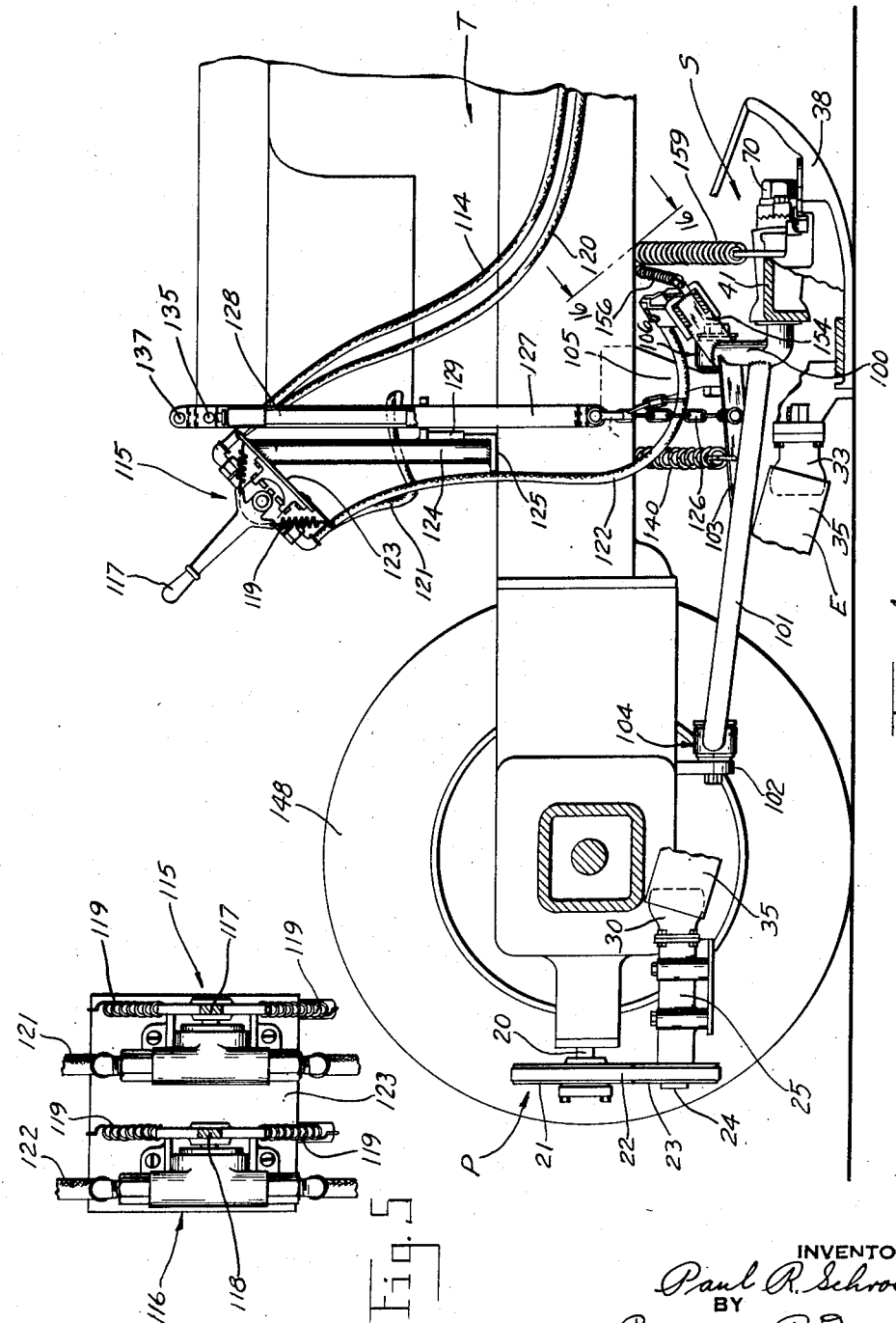

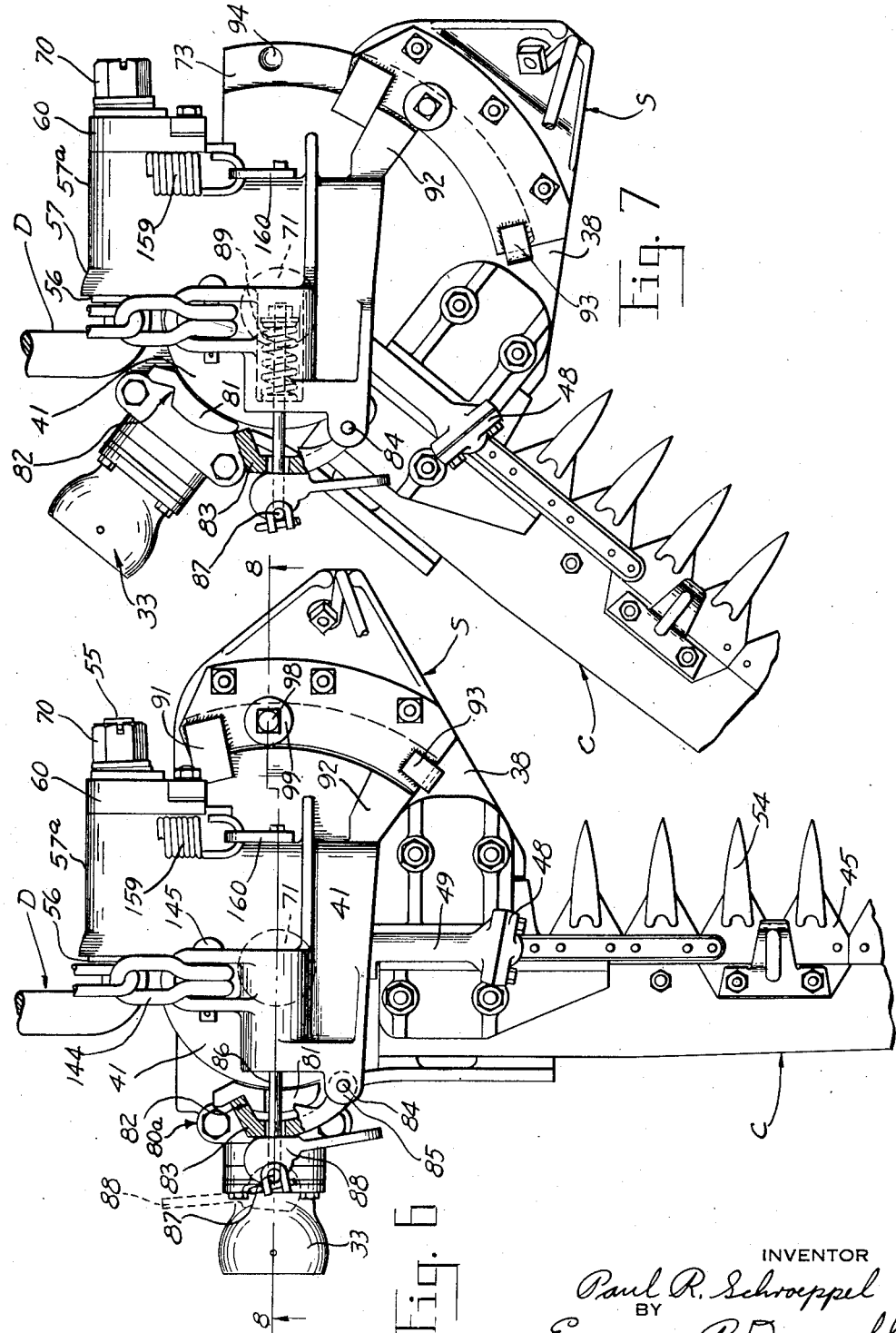

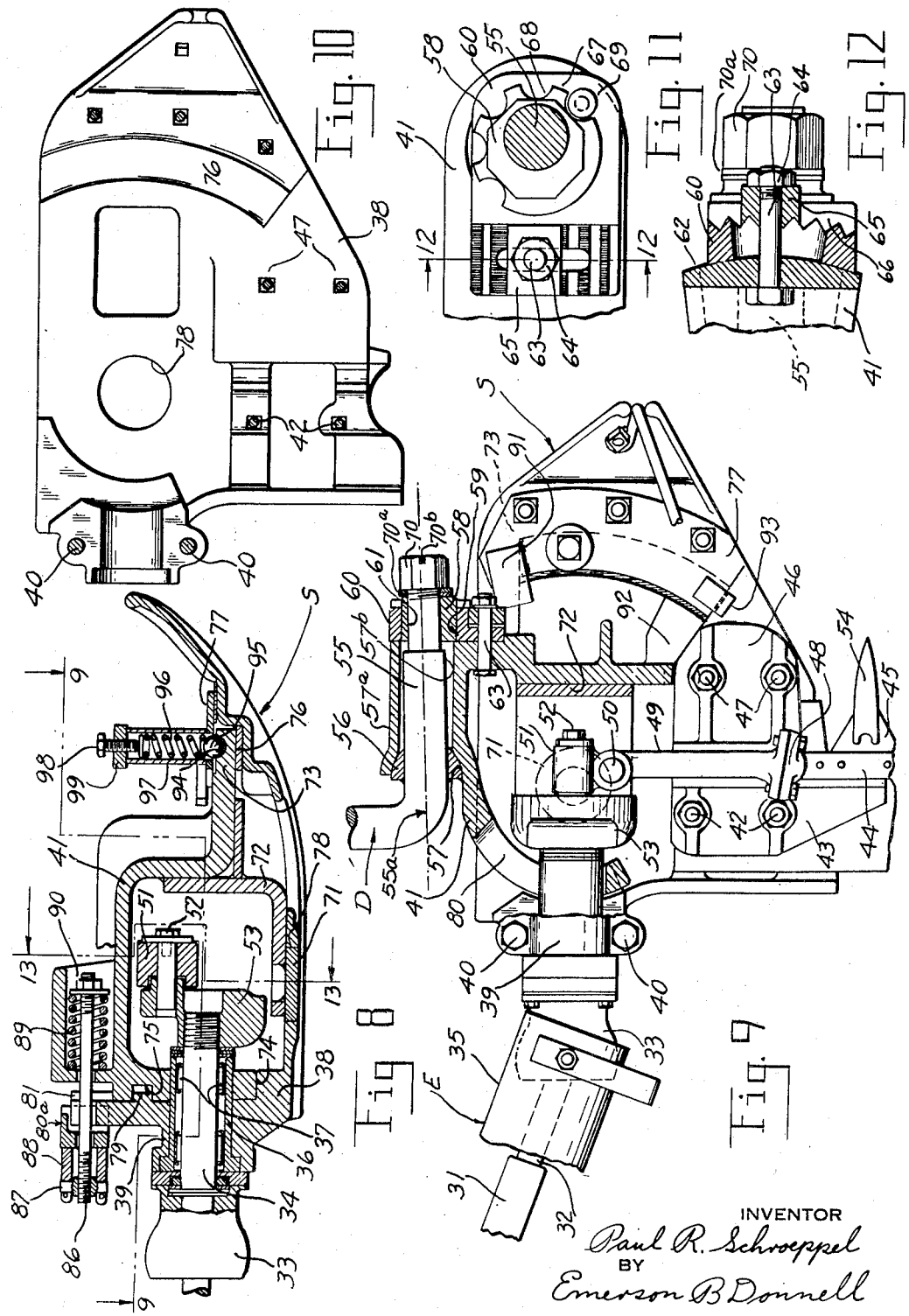

July 27, 1954  P. R. SCHROEPPEL  2,684,564
MOWER
Original Filed July 14, 1945  6 Sheets-Sheet 6
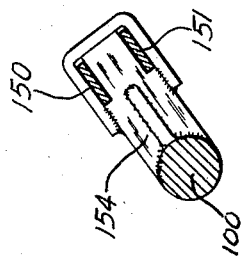
Fig. 15
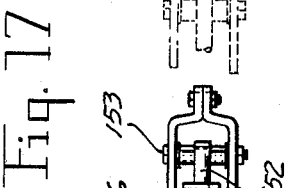
Fig. 17
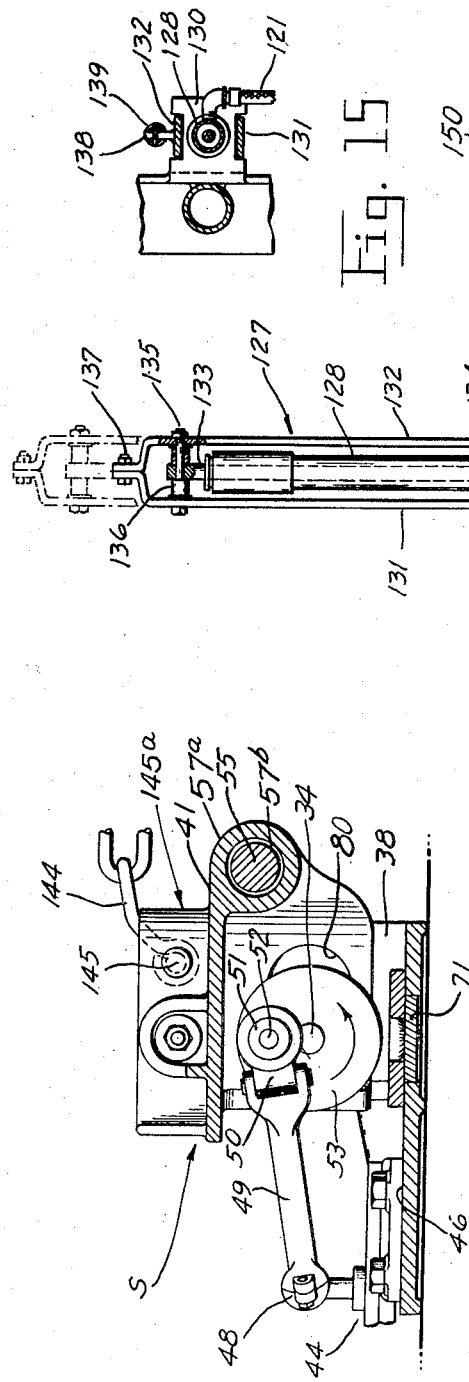
Fig. 14
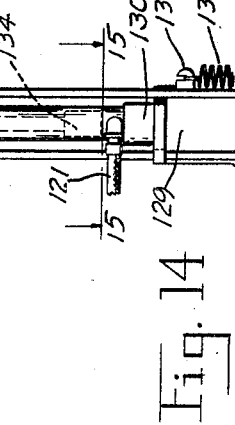
Fig. 16
Fig. 13
INVENTOR
Paul R. Schroeppel
BY
Emerson B. Donnell
ATTORNEY Patented July 27, 1954

2,684,564

UNITED STATES PATENT OFFICE 2,684,564

MOWER

Paul R. Schroeppel, Rockford, Ill., assignor to J. I. Case Company, Racine, Wis., a corporation of Wisconsin Original application July 14, 1945, Serial No. 605,004. Divided and this application November 15, 1950, Serial No. 195,724

6 Claims. (Cl. 56—25)

1

The present invention relates to mowers, and more particularly to mowers adapted to be mounted on and carried by tractors, and an object of the invention is to generally improve the construction and operation of devices of this class.

This application is a division of application Serial No. 605,004, filed July 14, 1945, now Patent No. 2,532,426.

More particularly, an object of the invention is to provide a mower which will have an extreme range of upward and downward swinging movement without disturbing the registration of the sickle with the guards.

Another object is to provide an improved adjustment for the cutter bar which will maintain the desired tilt of the guards in all positions of swinging of the bar and in which adjustments for tilt will not affect the lead of the cutter bar when swung to extreme upward or downward positions.

Other objects are to provide improved controls for the cutter bar position; an improved drag bar mounting; a greatly improved inner shoe which provides for relief of excessive stress in the event of encountering an obstruction; and an improved latch arrangement for such a shoe.

Other objects and advantages will become apparent from the following description and accompanying drawings, in which a satisfactory embodiment of the invention is shown, but it is to be understood that the invention is not limited to the exact details disclosed, but includes all such variations and modifications as fall within the spirit of the invention as herein expressed.

In the drawings,

Fig. 2 is a front elevation of the same, parts being broken away and others omitted where they form no part of the invention.

Fig. 3 is an enlarged section on the line 3—3 of Fig. 1.

Fig. 4 is a right side elevation partly in section on the line 4—4 of Fig. 2, with parts removed.

Fig. 5 is an enlarged detail of certain controls indicated in Fig. 4.

Fig. 6 is an enlarged plan view of certain mechanism indicated in Fig. 1.

Fig. 7 is a similar view with the parts in another position.

Fig. 8 is a vertical sectional view on the line 8—8 of Fig. 6.

2

Figure 1:
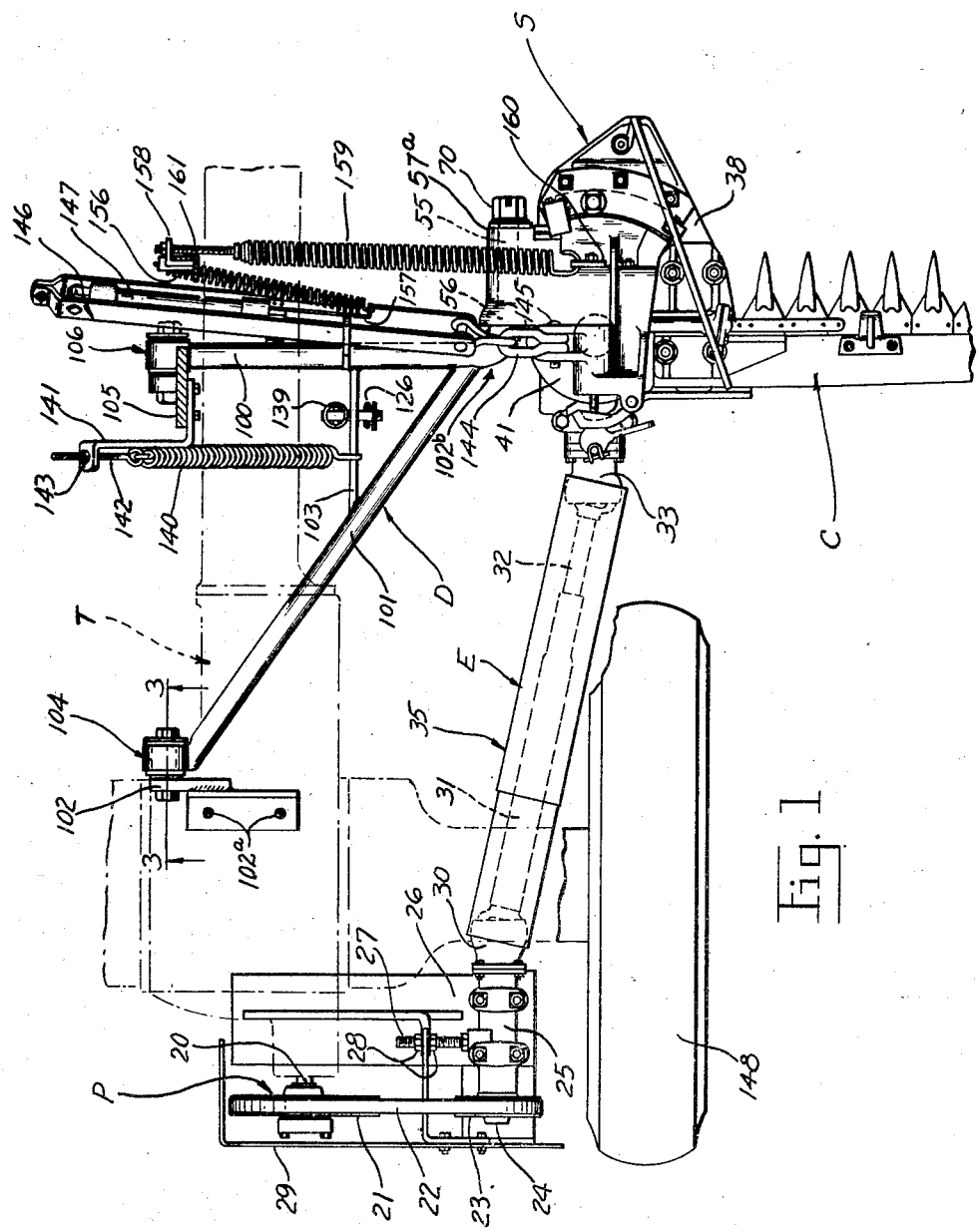
Figure 1 is a plan view of a device constructed according to the invention, in place on a tractor, the tractor being indicated in dotted lines and broken away to avoid obscuring any mower parts.

Fig. 9 is a horizontal sectional view on the line 9—9 of Fig. 8.

Fig. 10 is a plan view of certain parts indicated in Fig. 8.

Fig. 11 is an enlarged front elevation of certain mechanism indicated in Fig. 9.

Fig. 12 is a sectional view on the line 12—12 of Fig. 11.

Fig. 13 is a vertical sectional view on the line 13—13 of Fig. 8.

Fig. 14 is an enlarged front elevation of certain mechanism indicated in Fig. 2.

Fig. 15 is a horizontal sectional view on the line 15—15 of Fig. 14.

Fig. 16 is an enlarged detail taken on the line 16—16 of Fig. 4.

Fig. 17 is a sectional view taken on the line 17—17 of Fig. 16.

Similar reference characters have been applied to the same parts throughout the drawings and the following specification.

As seen in Fig. 1 the illustrative device is shown applied to a tractor T to which is attached a drag-bar D, which in turn serves to maintain a cutter bar C in correct relation to the tractor through connection with a shoe S fixedly connected with the cutter bar C. The mechanism of the mower is driven from a power take-off P driven from the tractor engine, not shown, in well-known manner, an extensible joint shaft E transmitting the motion to mechanism on the shoe, which will be fully described presently. The mower is thus carried on and operated by the tractor, necessary relative movements between the two being accommodated by extensible shaft E, extreme changes in position being possible in cutter bar C without interference with proper driving, as will appear.

Power take-off P includes a shaft 20 projecting from the rear of tractor T and rotatable from the engine power in well-known manner not necessary to describe further. Shaft 20 carries a pulley 21 driving, through a belt 22 a pulley 23 on a shaft 24. Shaft 24 is carried in a bearing element 25 supported on a bracket structure 26 so as to be shiftable for tightening belt 22, an adjusting bolt 27 having lock nuts 28—28 engaged with bracket 26 being fixed to bearing 25, manipulation of nuts 28—28 serving to shift bearing 25 in a controlled manner as will be understood. A guard or housing 29 is preferably carried by bracket 26 and encloses the belt and pulleys for reasons of safety.

Shaft 24 connects with a universal joint generally designated as 30 of suitable or well-known form driving a section 31 having a slidable but non-rotatable connection with a section 32 forming the active element of extensible shaft E. Section 32 connects with a universal joint generally designated as 33 which is preferably similar to above mentioned joint 30 and which connects with a crankshaft 34 best seen in Figs. 8, 9 and 13. An extensible housing of well-known form generally designated as 35 is supported between joints 30 and 33 to enclose the rotating shaft sections 31 and 32.

Crankshaft 34 in the present instance is supported in a needle type roller bearing 36 having rollers 37—37 to reduce friction and provide durable support against the vibration set up in this form of mechanism. Bearing 36 is firmly supported in a lower shoe portion and solidly retained therein by means of a cap 39 fixed to portion 38 as by screws 40—40. Portion 38 is rotatably mounted on an upper shoe portion 41 to relieve excessive stress in the event of encountering an obstruction, as will appear. Cutter bar C is fixedly attached to portion 38 by bolts or the like 42—42 which also retain in position a guide 43 for a knife-head 44 constituting part of a sickle 45. A complementary guide 46 for knifehead 44 is retained on portion 38 by bolts 47—47. Knife-head 44 connects by a ball joint 48 with a pitman 49 having a hinged connection 50 to a crank pin bearing 51 engaging a crank pin 52 carried by a crank disk 53 fixed on above mentioned crankshaft 34. It is to be noted that crankshaft 34 and ball joint 48 are substantially on a level so that pitman 49 swings above and below the extended path of travel of the joint 48. Since crank 53 turns counterclockwise as seen in Fig. 13, the resultant pressure on knife-head 44 as a consequence of the sickle actuating movement is always down on the cutter bar, thus minimizing the strain and wear on guides 43 and 46 and avoiding the development of up-and-down play and rattling of the sickle. Since crankshaft bearing 36 is rigidly mounted on shoe portion 38, which in turn is solidly fixed to cutter bar C, it follows that the motion of sickle 45 will always be the same relatively to cutter bar C and guards 54 regardless of any position that portion 38 may take. Universal joint 33 provides for the transmission of motion to crankshaft 34 throughout the possible range of movement of portion 38.

The present mower is particularly adapted for difficult conditions such for example as mowing the shoulders of highways where extreme upward and downward angles of the cutter bar are required. Such angularity may be achieved without disturbing the other adjustments of the mower, as will appear. Upper portion 41 is pivoted about a journal portion 55 of drag bar D, and which journal portion is directed, and remains, substantially parallel with the direction of travel of the tractor. Portion 41 swings about this journal, all angular adjustments of the shoe being accomplished without changing the position of the journal. A part-spherical bearing portion 56 is fixed on journal 55 on which is seated a socket portion 57 of above mentioned portion 41, the whole forming a suitable type of pivot bearing for the shoe S. Socket portion 57 continues as a sleeve portion 57ª enclosing journal 55 and formed larger than said journal so as to provide a clearance area 57ᵇ. Spaced from portion 57 a bushing 58 is rotatably received in a bore 59 in a cap-like fitting 60 and has a bore 61 which is eccentric to above mentioned bore 59. Fitting 60 is fixed with portion 41 so that shifting of bushing 58 will alter the position of portion 41 about spherical portion 56. In this way the cutter bar may be angled forward or back relatively to drag bar D so that the lead may be adjusted.

Fitting 60 is clamped immovably in contact with a surface 62 on shoe portion 41, which is curved about the center of spherical portion 56 so that relative movement of portion 41 and fitting 60 will result in angular adjustment of cutter bar C so as to tilt guards 54 upwardly or downwardly as desired. Fitting 60 is clamped in position by a bolt 63 engaged with portion 41 and maintaining, by means of a nut 64, a block 65 in clamping engagement with fitting 60, the latter and block 65 having interfitting teeth and notches 66 to positively locate fitting 60 when nut 64 is tightened. It will now be apparent that bushing 58 and fitting 60 constitute adjustable bearing means which can be adjusted at least to a limited extent in any direction laterally of or substantially normal to the axis of sleeve 57ª, to the extent permitted by the clearance area 57ᵇ.

As will now be apparent, shifting or bushing 58 for adjusting the lead of cutter bar C will also affect the tilt of the bar, but this is compensated for by loosening nut 64 and shifting portion 41 relatively to fitting 60, after which the parts are locked in position by tightening nut 64. Bushing 58 is fixed in position in fitting 60 by means of a flange 67 having a series of notches 68—68 one of which is engaged by a pin 69 projecting from fitting 60. Bushing 58 is disengaged from the pin by moving slightly to the right as seen in Fig. 9, and turning as by means of a wrench to the desired position. Bushing 58 is preferably given an angular outward configuration to facilitate this. A nut 70 on journal portion 55 presses bushing 58 backwardly against portion 41, thus keeping flange 67 in engagement with pin 69 and maintaining socket portion 57 seated on spherical portion 56. Washers 70ª are preferably interposed between nut 70 and bushing 58 and a locking pin 70ᵇ, Fig. 9, maintains the adjustment of nut 70. It will now be apparent that, although portion 41, and accordingly cutter bar C can be adjusted in any direction relatively to drag bar D, it always swings about the center-line of journal portion 55. Thus unlike prior structures which depend on adjustment of the drag bar for lead or tilt adjustment, or both, lead is not converted to tilt, and vice versa, when the cutter bar is swung into extreme upper or lower positions.

As above mentioned, lower portion 38 of shoe S is pivotally carried by upper portion 41, and in the event of encountering an obstruction by cutter bar C, may turn thereon, allowing cutter bar C to swing back and relieve the stress, thus saving the parts from damage. For this purpose upper portion 41 has a pintle 71 carried by a bracket 72 permanently secured to portion 41, said pintle establishing a vertical center line about which portion 38 may swing. Portion 41 also has a circumferential guiding flange 73, a circumferential guiding surface 74, and, preferably, a guiding groove 75. Lower portion 38 has a surface 76 complementary to flange 73 and a guiding plate 77, surface 76 and plate 77 enclosing flange 73 and guiding portion 38 in relation thereto. Portion 38 also has a portion 78 engaging pintle 71 to maintain portion 38 centered on portion 41. Portion 38 is formed complementary to surface 74 and above mentioned cap portion 39 preferably has a rib 79 engaging groove 75. The above described parts are so fitted as to provide for free pivoting of portion 38 about pintle 71, and portion 41 has a slot 80 providing for movement of bearing 36 with portion 38. Cutter bar C can therefore swing back if it encounters an obstruction, swinging portion 38 about pintle 71 and on its several guiding surfaces, but it will be noted that this swinging does not affect the relation of crankshaft 34 to sickle 45, nor the registration or stroke of the sickle.

It is necessary to prevent such pivoting of portion 38 under normal operation and a detent generally designated as 80a is provided for this purpose. In the present instance, cap 39, Fig. 8, has an upstanding portion 81 extending beyond rib 79 and having a notch 82 engaged by a latch 83, see also Figs. 6 and 7, pivoted on a pin 84 carried by ears as 85 on upper portion 41. Latch 83 is held in position by a tension rod 86 having a T head 87 on which is journaled a bifurcated cam lever 88 pressed against latch 83 by the pull of rod 86. Rod 86 is tensioned by a spring 89, Fig. 8. A nut and washer 90 anchor spring 89 to rod 86, and T head 87 is preferably threaded on rod 86 as shown. Swinging cam lever 88 to the dotted position shown in Fig. 6 releases the tension in rod 86, and, while so released, if cam lever 88 is rotated about rod 86 T head 87 will be shifted along rod 86 so that when the rod is again tensioned the adjustment will be different than before. In this manner the tension is readily controlled. When the tension is released as stated, cutter bar C may be readily swung back for ready access to pitman 49 and bearing 51, or for other reasons. A stop 91 on plate 77 engages a stop 92 on flange 73 at the limit of back-swinging of portion 41, and a stop 93 engages the outer edge of flange 73 when portion 38 is in normal position. Therefore it is not necessary to rely on latch 83 except to hold the parts against swinging back under normal loads.

While latch 83 is sufficient for this purpose, it is sometimes desirable, for example when mowers of this type are made with long heavy cutter bars, to have additional resistance against swinging back. In this event an opening or socket 94 is provided in flange 73 and a detent as for example a ball 95 is pressed by a spring 96 contained in a tubular housing 97 through a suitable opening in plate 77 into yielding engagement with opening 94. Housing 97 is anchored to plate 77. The pressure of spring 96 is adjusted by a screw 98 threaded in a cap 99 forming an upper closure for housing 97. Sufficient turning effort on portion 38 and plate 77 will dislodge detent 95 from opening 94 after which the detent will travel along the surface of flange 73 without causing appreciable resistance. The pressure necessary to so dislodge detent 95 will assist latch 83 so that the latter need not be adjusted so tightly in the event that an unusually long cutter bar is used. Furthermore, in the event of extreme loads of this sort the resistance to swinging is applied at two substantially diametrically opposite points, which tends to equalize the pressure on pintle 71 and the several guiding surfaces. Detent 95 can be given an approximate adjustment, and the exact desired resistance arrived at by adjusting T head 87.

Drag bar D includes a bar 100, Fig. 1, and a bar 101, the two being united in V relation and serving to support above mentioned journal portion 55 in fixed relation to the line of travel of the tractor T. Bar 100 extends transversely beneath the tractor substantially at right angles to the path of movement while bar 101 extends laterally and forwardly from a bracket 102 fixed on the tractor in any suitable manner as by bolts 102a, and is joined at 102b to bar 100. A brace 103 is extended between bars 100 and 101 to form a comparatively rigid triangular structure and to furnish an attaching point for certain mechanism as will appear. Drag bar D must be free to swing up and down to allow shoe S to follow uneven ground, and for this reason bar 101 is pivoted to bracket 102 at 104, while bar 100 is pivoted to a bracket 105 at 106. Due to the substantial spacing between pivots 104 and 106, journal 55 is held firmly in place without any appreciable tendency to swing back under the drag of the cutter bar.

In the present instance, pivotal connections 104 and 106 are of a special nature as best shown in Fig. 3, the two being identical, it is necessary to describe only one. Bar 101 is pivoted on a stud 107 carried by above mentioned bracket 102 and terminates in a ring-like eye portion 108 which extends about a stud 107 and is spaced therefrom by a bushing 109 and a body of rubber or rubber-like material 110. Material 110 is compressed axially of stud 107 between a washer 111 and a cap 112 by means of a nut 113 threaded on stud 107. This compression tends to extrude a portion of material 110 between the open ends of eye 108 and washer 111 and cap 112 respectively, so that eye 108 is cushioned in all directions from any metallic contact with stud 107 or bracket 102. Up-and-down swinging of bar 101 is relatively freely accommodated by turning bushing 109 on stud 107 or by distortion of the rubber-like material or both. These cushioned pivotal connections 104 and 106 serve to absorb a large amount of vibration normally present in a sickle drive and minimize pounding and wear of the parts. They also tend to isolate such vibrations from the tractor to an appreciable extent so as to minimize discomfort to the operator.

The type of mower disclosed as stated is particularly adapted for mowing the shoulders on highways where it is necessary to raise and lower shoe S quickly, for example to place it on a curb, to avoid culvert headings and the like, and it is also necessary to quickly swing cutter bar C to a substantially vertical position to pass mail boxes, avoid roadside fences and the like. These operations are under extremely close control by fluid pressure as will now appear.

A suitable source of fluid pressure of any well-known type, not shown, is disposed on the tractor and supplies fluid through a pipe 114 which leads to control valves generally designated as 115 and 116 which may be of any suitable or well-known type having operating handles 117 and 118 respectively. The valves are biased to a neutral position by means of springs 119—119 and under these conditions the fluid flows to the valves through above mentioned pipe 114 and returns to the supply through a hose or other conduit 120. There being no substantial pressure developed, no appreciable amount of power is consumed by this action. When it is desired to lift a part of the mower, the valves upon proper manipulation of one or the other of handles 117 and 118, interrupt the flow of fluid into conduit 120 whereupon pressure is immediately developed in pipe 114 and transmitted through connections 121 or 122 to actuate lifting rams as will appear directly. Release of handles 117 and 118 blocks the escape of fluid backwardly through connections 121 and 122 so that the rams are held in whatever position they have reached while fluid is again permitted to bypass through conduit 120. Actuation of either handle 117 or 118 in the opposite direction releases fluid from either connection 121 or 122 to conduit 120 and allows the ram connected to a particular conduit to retract. Valves 115 and 116 in the present instance are mounted on a plate 123 supported on the tractor in a convenient position for ready manipulation by the operator. Plate 123 in the present instance is fixed with the tubular column 124 fixed with a bracket 125 rigidly mounted on the tractor. For lifting shoe S, a flexible connection as chain 126 is extended from above mentioned brace 103 upwardly to a bifurcated tension member or yoke 127. Yoke 127 may be raised with the necessary degree of force by means of a cylinder 128 disposed within the yoke as better seen in Fig. 14. Cylinder 128 is seated on a pedestal 129 in the present instance carried by a portion of above mentioned bracket 125 and has a base portion 130 slotted to serve as a guide for side portions 131 and 132 of yoke 127. Cylinder 128 has a ram 133 actuated by a piston 134 within cylinder 128 and connected to side portions 131 and 132 by means of a bolt 135, spacers as 136 serving to locate ram 133 properly within yoke 127. Side portions 131 and 132 approach each other above bolt 135 and are united as by a bolt 137. In this manner a tension member is provided having sufficient strength to lift drag bar D and shoe S. Side portion 132 has an outwardly extending ear 138 to which is connected a retracting spring 139 anchored to above mentioned brace 103 as best seen in Fig. 1. Spring 139 exerts a continuous downward pressure on yoke 127 and maintains piston 134 at the bottom of cylinder 128 at such times as fluid pressure is not transmitted to cylinder 128. Pressure is transmitted when desired through above mentioned connection 121 to cylinder 128. Piston 134 being at its lowermost position, yoke 127 is so placed as to result in substantial slack in chain 126. Thus shoe S is free to float on uneven ground without interference from any part of the lifting connection.

A counterbalancing spring 140 extends transversely of the tractor and upwardly from brace 103 to an anchorage 141, Fig. 1, on above mentioned bracket 105 and is attached to an adjusting bolt 142 having a nut 143 for adjusting the tension of spring 140 as will be apparent. Spring 140 thus carries part of the weight of shoe S so as to avoid excessive ground pressure.

Upward swinging of cutter bar C is accomplished in a somewhat similar manner, a chain or flexible connection 144 engaging a pin 145 best shown in Fig. 2 spaced upwardly and outwardly from above mentioned journal 55 this portion of the shoe constituting an upwardly directed lever arm 145a. Chain 144 is connected to a yoke generally designated as 146 within which is positioned a fluid cylinder 147. Pressure fluid transmitted through connection 122 to cylinder 147 shifts yoke 146 to the right as seen in Fig. 2 thereby pivoting shoe S in a clockwise direction about journal 55. This action can swing cutter bar C to a substantially vertical position within the margins of a tractor wheel 148 so that the mower in this position will clear anything which the tractor will clear.

Turning to Fig. 16, cylinder 147 has a base portion 149 slotted for slidably receiving side portions 150 and 151 of yoke 146. Cylinder 147 also has a ram 152 which is coupled to side portions 150 and 151 by means of a bolt 153 in a manner similar to the connection of above mentioned ram 133. Spaced from base 149 is an abutment 154 extending outwardly from above mentioned bar 100 as best seen in Fig. 17, abutment 154 being slotted for slidably supporting side portions 150 and 151 of yoke 146. Ram 152 has a piston 155 slidable in cylinder 147 and, when pressure fluid is introduced into connection 122, cylinder 147 is first forced to the left in Fig. 16 until base 149 rests against abutment 154. Further movement of cylinder 147 is thus blocked and piston 155 then moves to the right forcing with it ram 152 and yoke 146. This exerts sufficient tension on chain 144 to pivot shoe S and rock cutter bar C upwardly as stated. When fluid is released through connection 122, the weight of cutter bar C moves yoke 146 to the left along with piston 155. However, in order to completely expel the fluid from cylinder 147, a spring 156 attached to a finger 157 extending from base 149 forces cylinder 147 to the right to the position shown in Fig. 16. Spring 156 is anchored to a bracket 158 fixed on the tractor. It will now be apparent, that spring 156 maintains cylinder 147 in its extreme right position in Fig. 16 and exerts a gentle tension on yoke 146 and chain 144. Up-and-down movement of cutter bar C is accommodated by the necessary to-and-fro motion of yoke 146 together with cylinder 147, this motion never being sufficient to seat base 149 on abutment 154. In this manner, the cutter bar is allowed to float over uneven ground without interference from cylinder 147.

An assisting spring 159 is pivoted to an ear 160 on shoe S outwardly and above journal 55 and tensioned between above mentioned bracket 158 and ear 160. The pull of spring 159 thus exerts a continuous turning moment on shoe S in a cutter bar raising direction. An adjusting bolt 161 may be manipulated in known manner to adjust the tension in spring 159 so as to avoid unnecessary pressure in cylinder 147 while not interfering with prompt lowering of the bar when desired.

The operation of the invention has been described where it would facilitate an understanding of the construction and further description should be unnecessary except to say that the mower bar projects at one side of the tractor for the usual purposes and may be swung upwardly substantially instantly upon manipulation of valve control lever 118 as necessary for avoiding obstructions such as fences and mail boxes and downwardly equally promptly when the obstructions are passed. This upswinging has not effect on the registration of the sickle since crankshaft 34 is journaled on the same portion of shoe S which swings with cutter bar C. In case it is desired to lift shoe S as necessary for avoiding curbs and the like, this may be done substantially instantly by manipulation of valve control lever 117. In case an obstruction is encountered, latch 83 releases and cutter bar C swings back to the position indicated in Fig. 7 so as to relieve the parts from injury. Again this does not affect the registration since crankshaft 34 remains in the same relation with cutter bar C and swings with it. Detent 95 assists latch 83 in holding cutter bar C in operative position if necessary.

The above being a complete description of an illustrative embodiment of the invention, what is claimed as new and desired to be secured by Letters Patent of the United States is:

1. In a mower of the type including a shoe, a cutter bar fixedly connected to the shoe, a crankshaft mounted for rotation on the shoe in fixed relation to the cutter bar, a sickle on the cutter bar, a pitman connected between the crankshaft and sickle, said shoe being mounted for up-and-down swinging movement about a center line extending generally in the direction of travel, said cutter bar, said sickle, said pitman and said crankshaft swinging together about said center line without disturbing their relations with each other, the improvement which comprises a portion journaled for rotation about said center line and adjustably fixed with said shoe for predetermining the position of said shoe relatively to said axis.

2. In a mower an inner shoe for the mower having a lower movable part and an upper relatively stationary part to which said movable part is pivoted on a substantially vertical axis, said stationary part being swingable on an axis extending substantially in the direction of progress of the mower, and a portion journaled on the last mentioned axis and adjustably fixed with said inner shoe for predetermining the position of said shoe relatively to said axis.

3. In a mower an inner shoe for the mower having a lower movable part fixed with the cutter bar and an upper relatively stationary part to which said movable part is pivoted on a substantially vertical axis, said stationary part being swingable on an axis extending substantially in the direction of progress of the mower, said parts embodying juxtaposed circumferential guiding flanges, said flanges having openings being so located as to register when said movable and stationary parts are in normal operative position, a spring pressed detent slidable in one of said openings and projecting into the other opening and resisting relative movement of said movable and stationary portions sufficiently to prevent such movement but so constituted as to be forced out of said other opening upon application of excessive pressure tending to pivot said movable part.

4. In a mower an inner shoe having a lower movable part and an upper relatively stationary part to which said movable part is pivoted on a substantially vertical axis, said stationary part being swingable on an axis extending substantially in the direction of progress of the shoe, said movable part having a portion upstanding alongside of said stationary part so as to move in a circular path upon pivoting of said movable part, a spring-pressed detent on said stationary part positioned to engage said upstanding portion and prevent pivoting of said movable part about said substantially vertical axis, said parts embodying juxtaposed circumferential guiding flanges, said flanges having openings so located as to register when said movable and stationary parts are in normal operative position, a spring-pressed detent in one of said openings engaging the other opening and resisting relative movement of said movable and stationary portions at a point substantially circumferentially spaced from the above mentioned detent, said detents being disengageable upon application of excessive pressure tending to pivot said movable part.

5. In a tractor mounted mower having a drag bar pivoted to the tractor on a longitudinal axis, a shoe pivoted to the drag bar and a cutter bar connected to the shoe, an arm portion extending upwardly from the shoe, a yoke flexibly attached to the arm portion and slidably supported from the drag bar, a fluid pressure cylinder slidably supported within the yoke and having a ram connected with the end of the yoke remote from the flexible connection with said arm portion, an abutment on the drag bar spaced from the cylinder, spring means connected with the cylinder and so disposed as to urge the cylinder away from the abutment to force the ram into the cylinder and to urge the yoke away from the shoe whereby swinging of the shoe about the drag bar is provided by sliding of the yoke and cylinder relatively to the drag bar, application of fluid to the cylinder first forcing the cylinder against the abutment and subsequently forcing the yoke relatively to the drag bar in a direction to rotate the shoe about its pivotal connection to the drag bar for raising said cutter bar.

6. In a tractor mounted mower having a drag bar pivoted to the tractor on a longitudinal axis and a shoe carried by the drag bar, a support on the tractor, a yoke slidable in an up-and-down direction relatively to the support, a fluid pressure cylinder on the support and having a ram extending upwardly and connected with the top of the yoke, a flexible connection from the bottom of the yoke to the drag bar and spring means connected with the yoke and disposed to exert a downward pressure thereon whereby to force the ram into the cylinder and maintain the yoke in its lowermost position except when pressure fluid is introduced into the cylinder.

References Cited in the file of this patent

UNITED STATES PATENTS

| Number | Name | Date |
| --- | --- | --- |
| 1,946,543 | Paul | Feb. 13, 1934 |
| 1,958,405 | Anthoney et al. | May 15, 1934 |
| 2,204,334 | Wagner | June 11, 1940 |
| 2,291,987 | Rogers | Aug. 4, 1942 |
| 2,311,095 | Simpson et al. | Feb. 16, 1943 |
| 2,328,838 | Oberlink | Sept. 7, 1943 |
| 2,495,986 | Schroeppel | Jan. 31, 1950 |